United States Patent Office 2,725,825
Patented Dec. 6, 1955

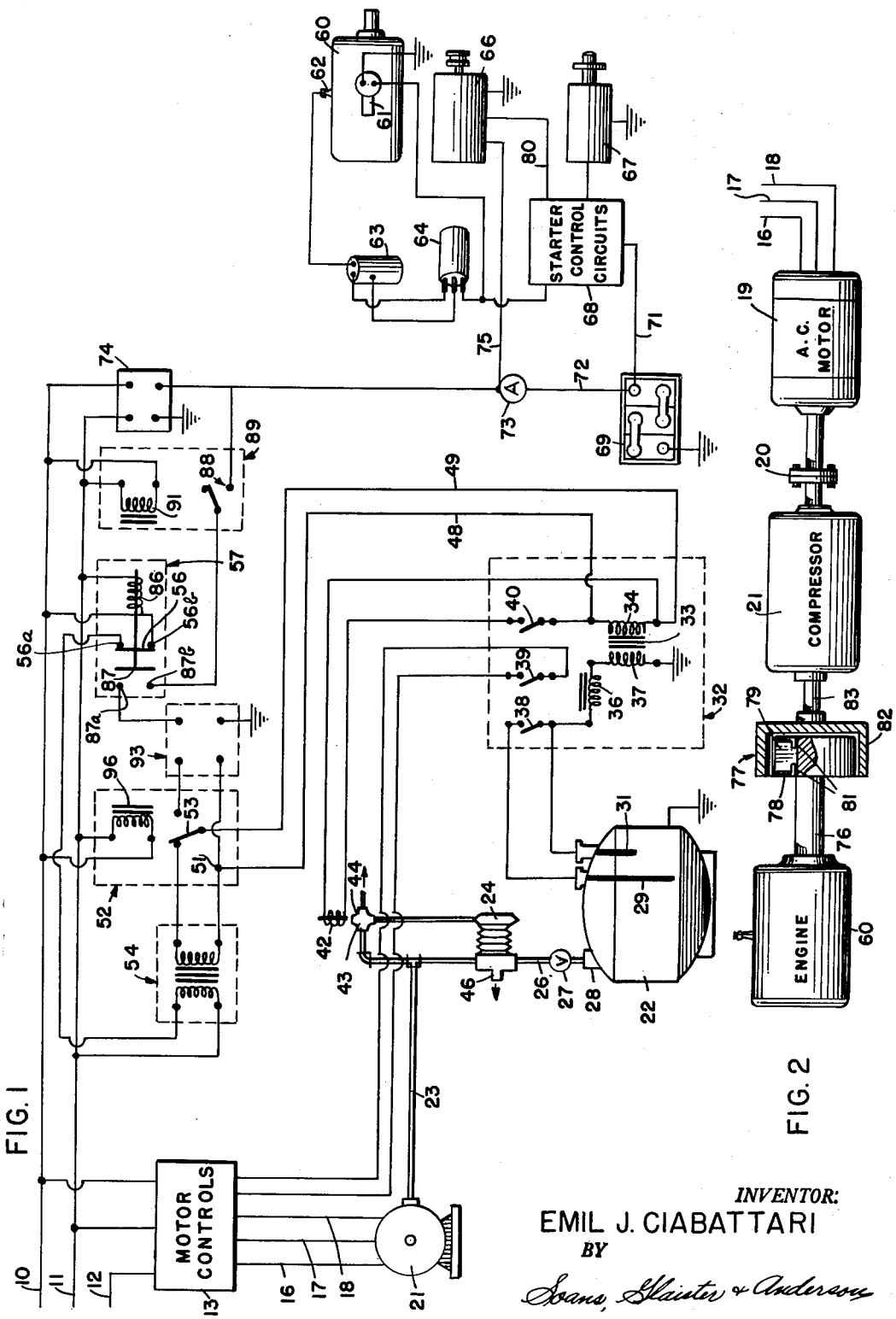

2,725,825

LIQUID HANDLING SYSTEM

Emil J. Ciabattari, Chicago, Ill., assignor to Yeomans Brothers Company, Melrose Park, Ill., a corporation of Delaware Application March 5, 1954, Serial No. 414,298

4 Claims. (Cl. 103—207)

The present invention is directed to improvements in liquid handling systems, and is particularly concerned with systems employing a pneumatically operated ejector for receiving sewage prior to its disposition into a sewer line or into a sewage treating plant.

The usual sewage handling system employs motors and electromagnetic control circuits operable to initiate the filling and discharging cycles of the pneumatically operated ejectors, and rely for their power upon the existing alternating current supply lines. In installations where there is not a wholly reliable source of power or where it is imperative that the ejection be operative at all times, it is important to provide some auxiliary source of power capable of operating the system upon failure of the main power source. The problem is especially urgent in remote rural areas where the changeover in operation from the normal alternating current lines to the emergency power system should be accomplished quickly and, if possible, automatically.

Since the various electromagnetic circuits governing the operation of the ejector units are usually designed for use in alternating current systems, it is also desirable that any system designed to operate the sewage handling apparatus during power failure of the normal source be capable of supplying an alternating current voltage to the control circuits. Hence, it is necessary not only to supply mechanical power for operating the compressors which deliver the compressed air to operate the pneumatic ejectors but also to provide a source of alternating current voltage to insure efficient operation of the control systems.

An object of the present invention, therefore, is to provide an improved sewage handling system with an emergency power supply which can take over the full operation of the existing system upon failure of the normal power source.

Another object of the invention is to provide a sewage handling system which is automatically shifted to an emergency power system in a rapid manner upon failure of the normal power system.

A still further object of the invention is to provide an emergency power system for liquid handling installations which not only supplies the mechanical power for operating the system but also the electric power for energizing the various control circuits.

Generally, the system of the present invention provides an emergency power system including a battery-energized internal combustion engine operable to drive the compressor supplying compressed air to the ejector unit upon failure of the normal electric power source, and to disengage itself from the compressor when the power returns, together with an electric control system for initiating operation of the engine promptly upon failure of the electric power source, and means for converting the direct current of the battery into an alternating current voltage for energizing the control circuits of the pneumatic ejector.

A further description of the present invention will be made in connection with the attached sheet of drawings which illustrate the improvements of the present invention as they are applied to a typical sewage handling apparatus.

Figure 1 is primarily a circuit diagram of the various control circuits for operating the pneumatic ejector and for transferring the operation of the system to the emergency power source; and Figure 2 is a fragmentary view of an air compressor constituting a part of the apparatus illustrated in Figure 1, and means for operating the compressor.

In Figure 1 reference numerals 10, 11, and 12 refer to leads from a suitable source of three phase alternating current voltage. The lines 10, 11, and 12 energize a suitable motor control assembly indicated generally at 13. It will be understood that the motor control assembly 13 may include suitable starting relays and transformers for energizing a three phase alternating current motor or other type of alternating current motor.

The motor control circuits 13 include three output lines 16, 17, and 18 which energize a three phase alternating current motor 19 (Figure 2) having certain features which will be described in greater detail in a subsequent portion of this description.

During normal operation of the system, when the alternating current source is operative and the emergency power system is in standby condition (a condition illustrated in Figure 1 of the drawings), the motor 19 is connected by means of a coupling 20 to an air compressor 21 (Figure 2) which supplies compressed air periodically to a pneumatic ejector vessel 22. A conduit 23 conducts the compressed air from the compressor 21 through a three-way diaphragm valve indicated at 24 into a conduit 26. After passing from the diaphragm valve 24, the air passes through a strainer 27 before entering the vessel 22 through an inlet 28.

The introduction of compressed air into the vessel 22 for the purpose of discharging the contents of the vessel may be controlled by any of a number of suitable arrangements, such as float control switches designed to introduce the air into vessel 22 when the level in the vessel reaches a desired high-water mark and to terminate the introduction of air when the level in the vessel 22 reaches a desired low-water mark. The level control system illustrated in Figure 1, instead of employing float valves, utilizes a pair of electrodes comprising a long electrode 29 and a short electrode 31, the length of the long electrode 29 determining the low-water mark and the length of the short electrode 31 determining the high-water mark.

The control of the energization of the motor 19 and hence, the compressor 21, is accomplished by the induction relay system indicated generally at 32. This system includes a transformer 33 having a primary winding 34 and a pair of secondary windings 36 and 37 connected in series. The transformer 33 controls the operation of three sets of relay contacts 38, 39, and 40 all of which are operated simultaneously when the transformer 33 is energized. This occurs when the level in the vessel 22 is sufficiently high so that the material in the vessel 22 bridges the space between the electrodes 29 and 31 thereby completing the circuit for the secondary of the transformer 33.

The first set of contacts, 38, when closed is effective to keep the induction relay 32 operative until the contents of the vessel 22 are sufficiently discharged so that the level drops below the long electrode 29.

The second set of contacts, 39, operates in conjunction with suitable relays in the motor control circuits 13 to assure that the induction relay system is energized before the alternating current motor 19 is supplied with power.

The third set of contacts, 40, is connected across the primary 34 of the transformer 33 to energize a solenoid 42 associated with a solenoid controlled, three-way valve 43. When the solenoid 42 is energized, the valve 43 switches into a position in which it relieves the air on one side of the diaphragm contained in the diaphragm valve 24 and vents this air through the atmosphere through a discharge opening 44.

The normal cycle of operation of the pneumatic ejector occurs as follows. A check valve associated with the inlet to the ejector 22 permits flow of liquid into the vessel 22 until such time as the level in the vessel reaches the short electrode 31. During this filling cycle, the induction relay 32 is inoperative and so the alternating current motor 19 is not running. When the level reaches the electrode 31, the induction relay 32 is energized, and the contacts 38, 39, and 40 are closed. The compressor 21 is then operated by the alternating current motor 19 to deliver compressed air into the vessel 22 through the lines 23 and 26. The additional pressure created by the introduction of the compressed air is effective to cut off the check valve in the inlet to the vessel 22 and to open a discharge check valve at the outlet to the vessel 22. During this time, the solenoid controlled three way valve 43 is in a position in which it permits the application of air pressure to one side of the diaphragm valve 24. When the level in the vessel 22 has been dropped sufficiently so that the long electrode 29 is completely exposed, the induction relay 32 is de-energized so that all the contacts 38, 39, and 40 open. The release of pressure thereby causes the discharge valve in the vessel 22 to close and the check valve in the inlet to open. During the filling cycle, the air is vented from the vessel 22 back through the inlet 28, the strainer 27, and line 26, to a vent 46 forming part of the three-way diaphragm valve 24. This completes the cycle of operation.

The primary 34 of the transformer 33 is energized through a pair of lines 48 and 49, the former being connected to a terminal 51 in a switching relay 52, and the latter being connected to the pivot point of a movable switch arm 53. In the switching relay 52, the switch arm 53 connects the primary 34 to the output of a step down transformer 54 when the alternating current source is operative. The transformer 54 is energized by connection of one side of its primary to the line 11 and the other side of the primary through a normally closed contact arm 56 of a time delay relay 57 to the line 10.

The operation described thus far represents the normal operation of the sewage handling system when the alternating current source is operative. To provide for operation of the system in the event of failure of the source, there is provided an auxiliary power system comprising an internal combustion engine 60 having an automatic choke 61 and sparkplugs 62. The engine 60 may have associated with it a normal electrical system including a distributor 63, an ignition coil 64, and a generator 66. The starting mechanism for the engine 60 may include a starter motor 67 and a system of starter control circuits 68 of the type frequently used to control cranking of such an engine. These starter control circuits by themselves are not a part of the present invention, but are commercially available units.

The emergency power system also includes a storage battery 69 having a lead 71 to the starter control circuits and a lead 72 to an ammeter 73. A third lead 75 connects the battery to the generator 66, and a lead 80 connects the latter to the starter control circuits 68. In as much as the standby power system will usually be inoperative for long periods of time, a trickle charger 74, connected across the lines 10 and 11, is provided to maintain charge in the battery 69, during the standby time.

As shown in Figure 2 the engine 60 has an output shaft 76 connected to a speed responsive clutch mechanism generally indicated at 77. The shaft 76 is connected to a rotor 78 on which a plurality of circumferentially spaced annular shoes 79 are disposed in recesses provided in the rotor 78. A plurality of leaf springs 81 normally urge the shoes 79 inwardly toward the center of the rotor 78. When the shaft 76 rotates at a sufficiently high velocity, the centrifugal force on the shoes 79 is sufficient to overcome the bias provided by the springs 81 and the shoes then engage a collar 82 connected to a shaft 83 to drive the compressor 21. The speed responsive clutch mechanism is used in installations of this type to assure that the engine is promptly cut off if the alternating current power should return suddenly. Since the alternating current motor 19 is fixedly secured by means of the coupling 20 to the compressor 21, the engine 60 would be continuously operated by the shaft 76 if the coupling between the engine 60 and the compressor 21 were permanent, even with the ignition circuit turned off.

In the system shown, however, means are provided for creating a time delay between the time that the alternating current power is restored and the time when the motor 19 is energized. In the illustrated embodiment, the time delay relay 57 which includes a coil 86 connected across the lines 10 and 11 and a double pole, double throw switch having a pair of contact arms 56 and 87.

When the alternating current power source becomes inoperative, the coil 86 is de-energized, causing the contact arm 56 to be disengaged from its contacts 56a and 56b while causing the second contact arm 87 to bridge its contacts 87a and 87b. The movement of the contact arm 87 into its closed position is accompanied by the closing of an ignition switch 88 included in an ignition switch assembly 89. The switch 88 is normally held in its open position as illustrated in the drawings as long as the alternating current source is operative by solenoid 91 connected across the lines 10 and 11.

The apparatus also includes means for supplying alternating current power to the induction relays 32. From the drawing, it will be seen that if the power in the alternating current lines should fail, the switch 88 is moved to a position in which it applies one side of the battery 69 to the contact arm 87 of the time delay relay, this contact arm being closed simultaneously by the de-energization of the coil 86. The voltage of the battery is then applied across an inverter 93 which is arranged to transform the six volt direct current from the battery into an alternating current voltage of sufficient magnitude to operate the induction relay system 32.

The output of the inverter is connected to the switch 53, the latter being under the control of a solenoid 96 connected across the lines 10 and 11. Upon de-energization of the solenoid 96, the switch 53 is shifted to a position in which it applies the output of the inverter 93 to the electromagnetic control circuits in the sewage handling system. It will be seen that this circuit is completed from the terminal 51 to the line 48 to the primary 34 of the transformer 33 and from the line 49 connected to the switch 53 and extending to the opposite side of the primary 34.

Thus, if the alternating current power should fail, each of the solenoids 91 and 96 and the coil 86 will be de-energized so that the switches 53, 88, and the time delay relay 57 will be switched over from the positions shown in Figure 1 with the result that the engine 60 will be cranked by the starter control circuits 68 and an alternating current voltage will be applied from the inverter 93 to the electromagnetic control circuits of the sewage handling system. The engine 60 after once having been started will run continuously to operate the compressor 21 until such time as the alternating current power is restored. It will be understood that suitable valve means can be provided to vent off the air leaving the compressor 21 at such time as air is not required in the vessel 22.

When the alternating current power is restored, the solenoids 91 and 96 and the coil 86 are re-energized. The switch 53 immediately shifts back to operate under alternating current conditions and applies the output of the transformer 54 to the primary 34 of the induction relay 32. The ignition switch 88 is also opened immediately, thereby opening the circuit of the battery 69. The time delay relay 57, however, includes a delay mechanism such as a dashpot which operates after a predetermined time interval to release the contact arm 87 from its engaged position and to engage the contact arm 56. This time interval is sufficiently long so that the speed responsive clutch 77 slows sufficiently to permit the clutch 77 to drop out of engagement with the compressor 21. After this time interval has elapsed, the system is put back on the normal alternating current operation by the movement of the contact arm 56 into its closed position.

I claim:

1. A liquid handling system comprising a pneumatically operated ejector, a compressor supplying compressed air to said ejector, a source of alternating current, an alternating current motor coupled to said compressor to drive said compressor, means responsive to the level of the liquid in said ejector for controlling the flow of compressed air into said ejector, said means including at least one electrically operated element, an internal combustion engine, a disengageable coupling means connecting said engine to said compressor to drive said compressor when said coupling means are engaged, an ignition circuit connected to said engine to initiate the operation thereof, a solenoid connected across said source of alternating current to hold said ignition circuit de-energized when said source of alternating current is operative, a battery, an inverter connected to said battery through said ignition circuit, said inverter being arranged to supply an alternating current voltage to said means for controlling the flow of compressed air into said ejector upon de-energization of said solenoid and the resulting energization of said ignition circuit, and a time delay switch connected between said source of alternating current and said alternating current motor to energize said alternating current motor an appreciable time interval after de-energization of said ignition circuit.

2. A sewage handling system comprising a pneumatically operated sewage ejector, a compressor supplying compressed air to said ejector, a source of alternating current, an alternating current motor coupled to said compressor to drive said compressor, means responsive to the level of the liquid in said ejector for controlling the flow of compressed air into said ejector, said means including at least one electrically operated element, an internal combustion engine, a disengageable coupling means connecting said engine to said compressor to drive said compressor when said coupling means are engaged, an ignition circuit comprising an ignition switch and a starter assembly connected to said engine to initiate the operation thereof, a solenoid connected across said source of alternating current and cooperating with said ignition switch to hold said ignition switch open when said source of alternating current is operative, a battery, means connecting said battery with said ignition circuit, an inverter connected to said battery through said ignition switch, means operable by de-energization of said alternating current source to connect said means for controlling the flow of compressed air into said ejector in circuit relationship with said inverter, a time delay switch, and a coil connected across said source of alternating current controlling the operation of said time delay switch.

3. A sewage handling system comprising a pneumatically operated sewage ejector, a compressor supplying compressed air to said ejector, a source of alternating current, an alternating current motor coupled to said compressor to drive said compressor, electromagnetic means for controlling the flow of air to and from said ejector, means responsive to the level of the liquid in said ejector controlling operation of said electromagnetic means, an internal combustion engine, a speed responsive coupling connecting said engine to said compressor, said coupling being engageable with said compressor to drive said compressor after said engine reaches a predetermined speed, and disengagable when said engine drops below said speed, an ignition circuit comprising an ignition switch and a starter assembly connected to said engine to initiate the operation thereof, a solenoid connected across said source of alternating current and cooperating with said ignition switch to hold said ignition switch open when said source of alternating current is operative, a battery, means connecting said battery with said ignition circuit, an inverter connected to said battery through said ignition switch, said inverter being arranged to supply an alternating current voltage to said electromagnetic means upon de-energization of said solenoid and the resulting energization of said ignition circuit, a time delay switch, and a coil connected across said source of alternating current controlling the operation of said time delay switch, said time delay switch delaying the application of alternating current power from said alternating current source to said motor a sufficient time after the opening of said ignition switch so that said speed responsive coupling becomes disengaged.

4. A sewage handling system comprising a pneumatically operated sewage ejector, a compressor supplying compressed air to said ejector, a source of alternating current, an alternating current motor coupled to said compressor to drive said compressor, electromagnetic means for timing the introduction of compressed air into said ejector, means responsive to the level in said ejector controlling operation of said electromagnetic means, an internal combustion engine, a speed responsive coupling connecting said engine to said compressor, said coupling being engageable with said compressor to drive said compressor after said engine reaches a predetermined speed and disengageable when said engine drops below said speed, an ignition circuit comprising an ignition switch and a starter assembly connected to said engine to initiate operation thereof, a solenoid connected across said source of alternating current and cooperating with said ignition switch to hold said ignition switch open when said source of alternating current is operative, a battery, means connecting said battery with said ignition circuit, an inverter connected to said battery through said ignition switch, means operable by de-energization of said alternating current source to connect said electromagnetic means in circuit relationship with said inverter, a time delay switch, and a coil connected across said source of alternating current controlling the operation of said time delay switch, said time delay switch delaying the application of alternating current power from said alternating current source to said motor a sufficient time after opening of said ignition switch so that said speed responsive coupling becomes disengaged.

No references cited.